United States Patent
Sawyers et al.

(10) Patent No.: US 9,189,042 B2
(45) Date of Patent: Nov. 17, 2015

(54) COMPUTER SYSTEM WITH POWER MEASUREMENT

(75) Inventors: Thomas P. Sawyers, Hempstead, TX (US); Qijun Chen, Spring, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 336 days.

(21) Appl. No.: 13/811,721

(22) PCT Filed: Sep. 27, 2010

(86) PCT No.: PCT/US2010/050332
§ 371 (c)(1),
(2), (4) Date: Jan. 23, 2013

(87) PCT Pub. No.: WO2012/044275
PCT Pub. Date: Apr. 5, 2012

(65) Prior Publication Data
US 2013/0124903 A1    May 16, 2013

(51) Int. Cl.
G06F 1/26 (2006.01)
G06F 1/32 (2006.01)
G06F 11/30 (2006.01)
G06F 11/32 (2006.01)

(52) U.S. Cl.
CPC ............ *G06F 1/26* (2013.01); *G06F 1/3206* (2013.01); *G06F 11/3062* (2013.01); *G06F 11/3072* (2013.01); *G06F 11/328* (2013.01)

(58) Field of Classification Search
CPC ....... G06F 1/3202; G06F 1/3231; G06F 1/26; G06F 1/206; G06F 1/3228; G06F 1/08; G06F 1/3289; G06F 1/266; H04L 12/12; H04L 12/10

USPC ................. 713/300, 310, 320, 330
See application file for complete search history.

(56) References Cited

U.S. PATENT DOCUMENTS

| | | | |
|---|---|---|---|
| 4,736,361 | A | 4/1988 | Cooperman et al. |
| 5,572,438 | A | 11/1996 | Ehlers |
| 6,157,292 | A | 12/2000 | Piercy |
| 6,367,023 | B2 | 4/2002 | Kling et al. |
| 6,388,564 | B1 | 5/2002 | Piercy |
| 6,548,967 | B1 | 4/2003 | Dowling |
| 6,624,532 | B1 | 9/2003 | Davidow |
| 6,639,383 | B2 | 10/2003 | Nelson et al. |
| 6,681,154 | B2 | 1/2004 | Nierlich et al. |
| 6,714,016 | B2 * | 3/2004 | Odaohhara et al. ........... 324/427 |
| 6,853,291 | B1 | 2/2005 | Aisa |
| 6,998,964 | B2 | 2/2006 | Lomax et al. |
| 7,002,265 | B2 | 2/2006 | Potega |
| 7,333,000 | B2 | 2/2008 | Vassallo |
| 7,426,452 | B2 | 9/2008 | Zielinski et al. |

(Continued)

OTHER PUBLICATIONS

International Searching Authority. International search report. Date of mailing May 24, 2011. International Application No. PCT/US2010/050332. Filing date Sep. 27, 2010.

*Primary Examiner* — Zahid Choudhury
(74) *Attorney, Agent, or Firm* — HP Legal Department

(57) ABSTRACT

Apparatus and methods are provided for use with computers. A power supply includes metering to determine the instantaneous and cumulative energy consumption of the power supply and a computer coupled thereto. Communications enable the power supply to communicate corresponding power data to the computer. A user of the computer can then view the power data and assess the effectiveness of energy conservation efforts.

19 Claims, 3 Drawing Sheets

(56) References Cited

U.S. PATENT DOCUMENTS

| | | |
|---|---|---|
| 7,499,762 B2 | 3/2009 | Khorramshahi |
| 7,793,117 B2 * | 9/2010 | Smith .......................... 713/300 |
| 7,853,818 B2 * | 12/2010 | Nguyen ....................... 713/340 |
| 2002/0103655 A1 | 8/2002 | Boies |
| 2002/0162032 A1 | 10/2002 | Gundersen |
| 2003/0056012 A1 | 3/2003 | Modeste |
| 2003/0159073 A1 * | 8/2003 | Breen et al. ................. 713/300 |
| 2003/0225483 A1 | 12/2003 | Santinato |
| 2005/0043858 A1 | 2/2005 | Gelman |
| 2005/0065742 A1 | 3/2005 | Rodgers |
| 2006/0010330 A1 * | 1/2006 | Wu et al. ..................... 713/300 |
| 2006/0041763 A1 | 2/2006 | Borkar et al. |
| 2006/0276938 A1 | 12/2006 | Miller |
| 2007/0096562 A1 | 5/2007 | Bainbridge et al. |
| 2007/0271477 A1 | 11/2007 | Brewer et al. |
| 2008/0039979 A1 | 2/2008 | Bridges |
| 2008/0219186 A1 | 9/2008 | Bell |
| 2009/0045804 A1 | 2/2009 | Durling |
| 2009/0088907 A1 | 4/2009 | Lewis |
| 2009/0109056 A1 | 4/2009 | Tamarkin et al. |
| 2009/0174393 A1 * | 7/2009 | Dishman et al. .............. 324/114 |
| 2009/0198460 A1 | 8/2009 | Carroll et al. |
| 2011/0077878 A1 * | 3/2011 | Lathrop et al. ................. 702/62 |
| 2011/0302440 A1 * | 12/2011 | DiMarco et al. .............. 713/340 |
| 2012/0080949 A1 * | 4/2012 | Gelonese ....................... 307/31 |

* cited by examiner

COMPUTER SYSTEM WITH POWER MEASUREMENT

BACKGROUND

Power supplies are widely used in providing operating electrical energy to laptop computers, notebook computers and other devices. Typically, alternating-current (AC) power is received from a utility source and converted to regulated, direct-current (DC) energy. Such conditioned electrical power is then provided to a laptop computer or other load.

Conservation of all forms of energy is of increasing concern. However, most contemporary laptop and notebook computers do not provide their users with any sort of data regarding instantaneous or cumulative energy consumption. As a result, users cannot gauge the effectiveness of their energy conservation efforts with respect to their portable computer use. The present teachings address the foregoing concerns.

BRIEF DESCRIPTION OF THE DRAWINGS

The present embodiments will now be described, by way of example, with reference to the accompanying drawings, in which.

DETAILED DESCRIPTION

Introduction

Apparatus and methods are provided for use with computers. A power supply includes metering to determine the instantaneous and cumulative energy consumption of the power supply and a computer coupled to the power supply. Communications circuitry enables the power supply to communicate corresponding power data to the computer. A user of the computer can then view the power data and assess the effectiveness of various energy conservation efforts.

In one embodiment, a system includes a power supply configured to provide regulated electrical power to a computer. The power supply is further configured to communicate power data to the computer, the power data representing electrical power provided from a source to the power supply. The system also includes a computer configured to receive the regulated electrical power and the power data from the power supply.

In another embodiment, a power supply includes power circuitry configured to receive electrical power from a source and to provide conditioned electrical power to a computer. The power supply also includes signaling circuitry configured to provide analog signals to the computer. The power supply additionally includes a controller configured to measure electrical power provided from the source to the power supply and to derive power data corresponding to the measurements. The power supply further includes communications circuitry configured to superimpose digital signals onto the analog signals. The controller is further configured to provide the power data to the computer by way of the communications circuitry.

First Illustrative System

Figure 1A:
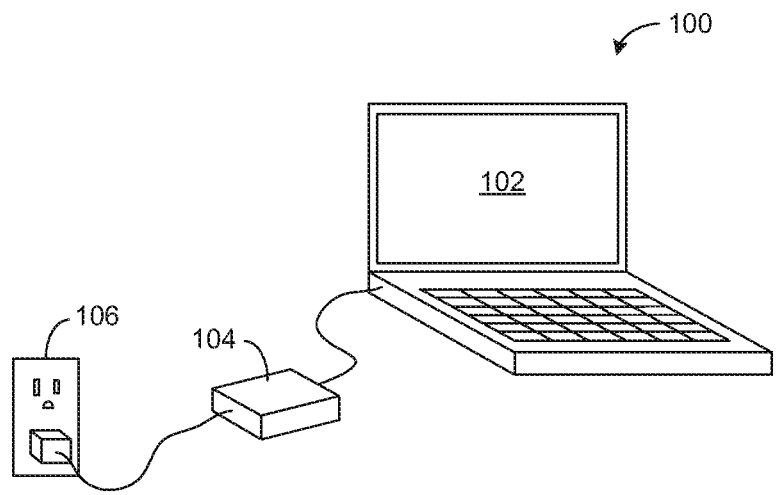
FIG. 1A depicts a diagrammatic view of a system according to one embodiment.

Reference is now made to FIG. 1A, which depicts a diagrammatic view of a system 100. The system 100 is illustrative and non-limiting with respect to the present teachings. Thus, other systems can be configured and/or operated in accordance with the present teachings.

The system 100 includes a laptop (i.e., portable) computer 102. The computer 102 can be defined by any suitable laptop or notebook computer that includes aspects of the present teachings described hereinafter. The computer 102 is coupled to a power supply 104. The power supply 104 includes aspects of the present teachings described in further detail hereinafter. The power supply 104 is also referred to as an alternating-current (AC) adapter 104 for purposes of the present teachings. The power supply 104 is connected to a source 106 of electrical energy. The source 106 is depicted as a convenience receptacle for purposes of simplicity. However, it is to be understood that the source 106 can be defined by or coupled to any suitable source of electrical power such as an electrical distribution utility, a local generator set, a renewable energy source such as solar or wind power, etc.

General, normal operation of the system 100 is a follows: the power supply 104 receives electrical energy from the source 106. In one illustrative and non-limiting embodiment, the source 106 provides AC electrical power of one-hundred twenty volts RMS at sixty Hertz sinusoidal frequency. Other suitable sources 106, respectively characterized by other electrical parameters, can also be used.

The power supply 104 provides conditioned electrical operating power to the computer 102. In one embodiment, the power supply 104 provides a regulated output of about nineteen volts direct-current (DC) to the computer 102. Other suitable output specifications can also be used. In turn, the computer 102 can operate normally by virtue of the conditioned electrical power provided by the AC adapter 104.

Additionally, the power supply 104 is configured to measure the electrical power provided by the source 106 and to provide corresponding power data to the computer 102. This power data, which corresponds to the energy consumption of the computer 102, can then be displayed to a user. A user thus gains an awareness of the computer 102 energy demands, as well as objective, quantified feedback regarding any electrical conservation efforts made by the user or by automated means.

Figure 1B:
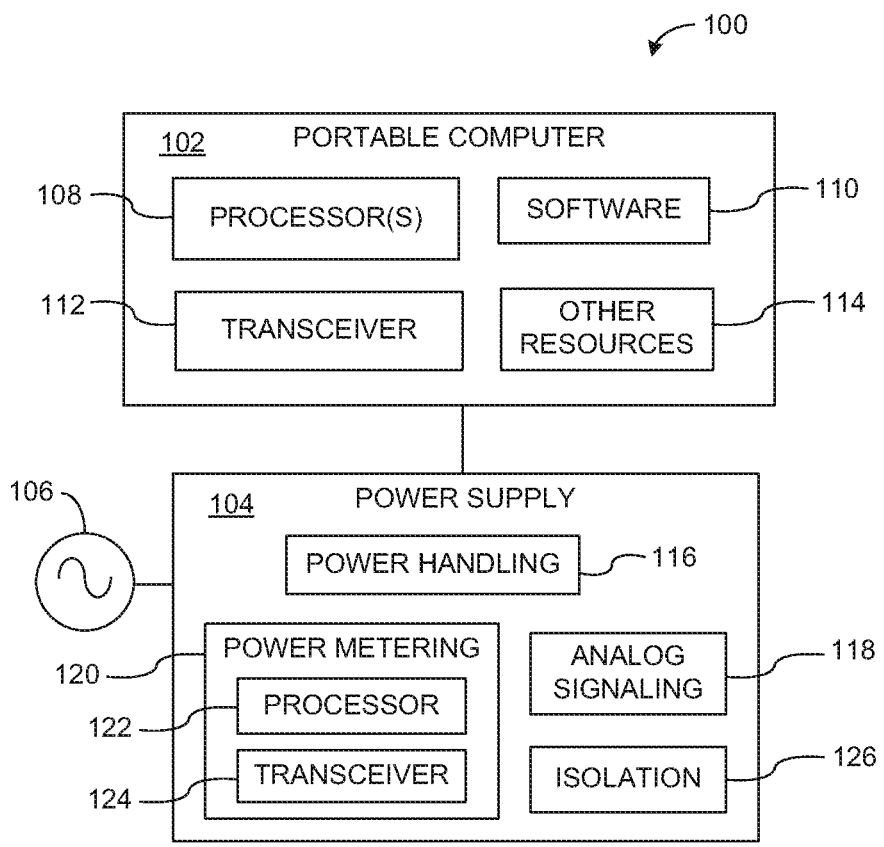
FIG. 1B depicts a block diagram of the system of FIG. 1A.

Attention is now directed to FIG. 1B, which depicts a block diagram of the system 100 introduced above. The computer 102 includes one or more processors 108. The processor(s) 108 is/are configured to operate in accordance with an executable program code such as, for non-limiting example, software 110. The software 110 is defined by energy software configured to cause the computer 102 receive power data from the power supply 104 and to display that data to a user.

The computer 102 also includes a transceiver 112. The transceiver 112 is configured to couple the computer 102 in data communication with the power supply 104. In one embodiment, the transceiver 112 is defined by a "one-wire" transceiver as available from Maxim Integrated Products, Inc., Sunnyvale, Calif., USA. Other suitable transceivers can also be used. The transceiver 112 is configured to extract digital signals (i.e., data) superimposed upon analog signals communicated between the power supply 104 and the computer 102.

The computer 102 further includes other resources 114. Non-limiting examples of the other resources 114 include a display, a keyboard, a mouse or other user input device, memory, magnetic data storage, optical data storage, input/output circuitry, etc. One having ordinary skill in the computer arts appreciates the various and numerous resources typical of and optional to laptop and similar computers, and further illustration is not needed for an understanding of the present teachings.

The power supply 104 includes power handling 116. The power handling 116 can include any suitable circuitry or resources, and is configured to receive electrical energy from the source 106 and to derive conditioned (regulated) electrical power suitable for operating the computer 102. The power supply 104 also includes analog signaling 118. The analog signaling 118 includes circuitry configured to provide DC-level or very low frequency signals to the computer 102 for purposes such as throttling control or power supply identification. Other operations can also be performed or controlled by way of the analog signaling 118.

The power supply 104 also includes power metering 120 according to the present teachings. The power metering 120 includes circuitry and resources configured for measuring instantaneous electrical power provided from the source 106 to the power supply 104. Such measured electrical power is the summation of the energy consumption of the computer 102 and the quiescent consumption of the power supply 104. The power metering 120 then derives digital data corresponding to the power measurements. The power metering 120 is also configured to totalize (i.e., time integrate) electrical power provided by the source 106 so that total electrical consumption (e.g., watt-hours, etc.) over a period of time can be evaluated.

The power metering 120 includes a processor 122. In another embodiment, a microcontroller or state machine is used as (or instead of) the processor 122. The processor 122 performs various tasks according to a program code embedded therein, such as electrical power totalization, data storage and communications, etc.

The power metering 120 further includes a transceiver 124 configured to couple the processor 122 in data communication with the computer 102. The transceiver 124 is configured to superimpose digital signals onto the analog signals provided by the analog signaling 118. Other transceivers and communication protocols can also be used. The transceiver 124 is AC coupled to the analog signaling 118 by way of isolation circuitry 126. The isolation circuitry 126 can include an opto-isolator, signal isolation transformer, AC coupling capacitors or other circuit elements. The isolation circuitry 126 is configured to prevent DC coupling between the processor 122 and the analog signaling 118.

First Illustrative Method

Figure 2:
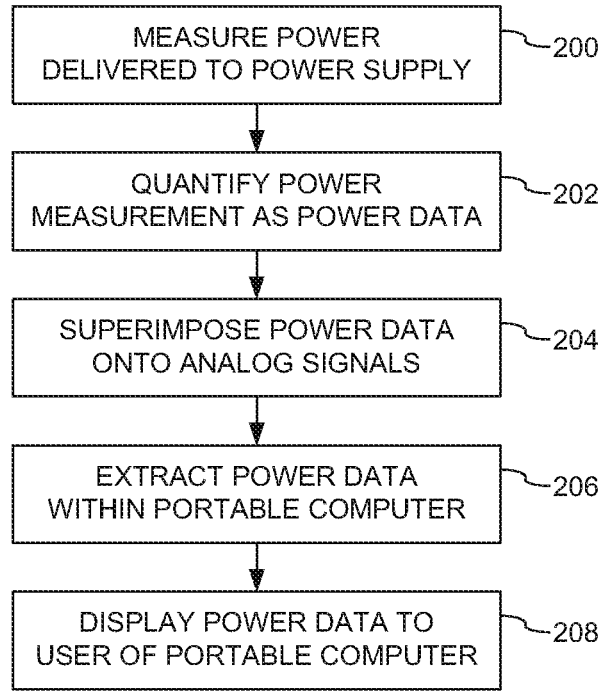
FIG. 2 depicts a flow diagram of a method according to one embodiment.

FIG. 2 is a flow diagram depicting a method according to one embodiment of the present teachings. The method of FIG. 2 includes particular operations and order of execution. However, other methods including other operations, omitting one or more of the depicted operations, and/or proceeding in other orders of execution can also be used according to the present teachings. Thus, the method of FIG. 2 is illustrative and non-limiting in nature. Reference is also made to FIGS. 1A and 1B in the interest of understanding the method of FIG. 2.

At 200, power delivered from a source to the power supply is measured. For purposes of non-limiting illustration, it is assumed that electrical energy is provided from the source 106 to the power supply 104. It is further assumed that power metering 120 measures the instantaneous current and voltage (or signals derived directly there from) as provided by the source 106. The mathematical product of the current and voltage (i.e., current×voltage) is equal, or directly correspondent, to the instantaneous power consumption of the computer 102 and the power supply 104. Power factor can also be measured in accordance with the particular embodiment and resources of the power metering 120.

At 202, the electrical power measurement is quantified as digital data. For purposes of the ongoing example, it is assumed that the values measured at 200 above are used to derive an instantaneous power value in watts, volt-amperes, or other suitable units. The derived value is referred to as the power data or a portion of such data. It is noted that the individually measured values of voltage, current and power factor can also be respectively quantified and included in the overall power data. The processor 122 performs the digital data derivation in accordance with its embedded program code.

At 204, the power data is superimposed onto analog signals. For purposes of the ongoing example, it is assumed that the digital signals corresponding to the power data are superimposed onto analog signals from the power supply 104 to the computer 102. The transceiver 124 performs the digital signal superimposition by way of the isolation circuitry 126.

At 206, the power data is extracted from the analog signals within the portable computer. For purposes of the example, it is assumed that the transceiver 112 is coupled to the analog signaling provided by the power supply 104. The transceiver 112 then operates to extract (identify and isolate) the digital signal content superimposed on the analog signals by the transceiver 124.

At 208, the power data is displayed to a user of the portable computer. For purposes of the illustration, it is assumed that the computer 102 uses the energy software 110 to display the power data to the user, including appropriate engineering units, time/date stamps, etc. The displayed power data can be instantaneous or totalized power values, voltage or current values, averages, maximums or minimums of these respective values, etc.

In accordance with the present teachings, and without limitation, a power supply has circuitry, a processor or other resources as needed to provide operating power to a portable computer. The power supply is further configured to measure electrical power provided by a utility or other source. The measured electrical power values can also be totalized over time. Digital data, referred to herein as power data, is derived in accordance with the measured or totalized electrical values.

The power data is communicated from the power supply to the associated portable computer. Such communications can be performed in response to a computer request for the power data or in accordance with a predetermined time schedule (every hour, once a day, etc.). The power data are provided to the computer as digital signals superimposed onto analog signals that are communicated between the power supply and the computer.

A transceiver within the computer separates the digital signals from the analog signals and provides the corresponding power data to the processor(s) of the portable computer. Energy software is used by the computer to display the power data—and optionally, other energy-related information—to a user. The energy software can track historical energy consumption, project energy or cost savings based on user conservation efforts, etc.

First Illustrative Embodiment

Figure 3:
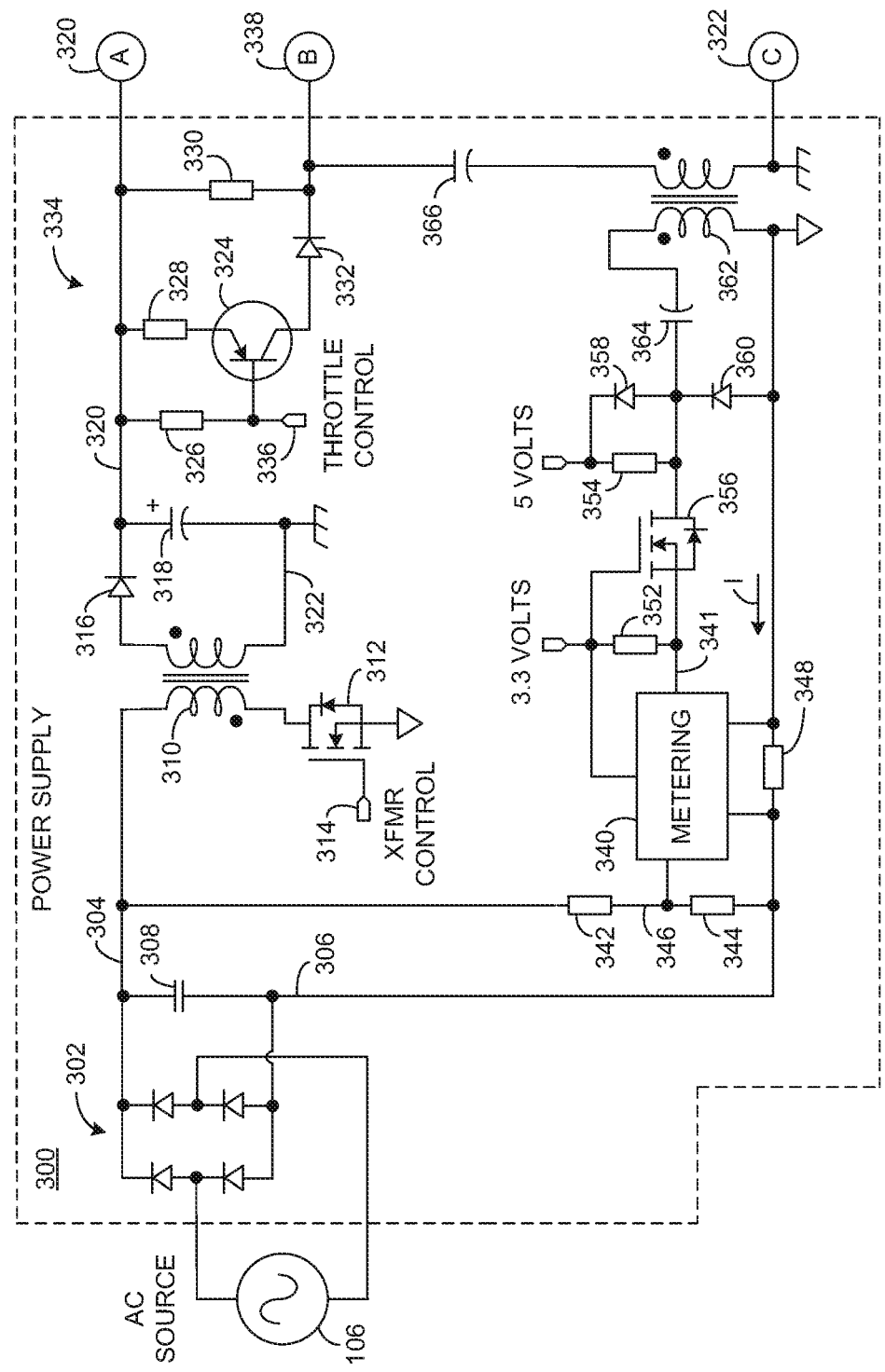
FIG. 3 depicts a schematic diagram of an apparatus according to one embodiment.

FIG. 3 is a schematic diagram depicting a power supply 300. The power supply 300 is illustrative and non-limiting in nature Other power supplies inclusive of the present teachings are contemplated.

The power supply 300 includes a rectifier 302 defined by four diodes. In another embodiment, the rectifier 302 is defined by an integrated circuit device. The rectifier 302 receives AC electrical power from a source 106 and provides rectified current to, and DC voltage between, a positive node 304 and a negative node 306. A filter capacitor 308 is coupled across the positive node 304 and the negative node 306 and operates to smooth the pulsating DC energy provided by the rectifier 302.

The power supply 300 also includes a power transformer 310 connected to a control (or switch) transistor 312. Control signals are connected to the transistor 312 by way of an input node 314. Electrical current flows through the primary side of the power transformer 310 according to the present conductive state (on or off) of the transistor 312. In turn, a corresponding electrical potential is induced in the secondary side of the power transformer 310 and is rectified by a diode 316 and filtered by a capacitor 318. A regulated DC voltage is thus provided between a positive output node 320 and a ground (or negative) node 322. Operating power is provided to a computer (e.g., 102, etc.) by way of electrical energy at the respective output nodes 320 and 322.

The power supply 300 also includes a transistor 324, respective resistors 326, 328 and 330, and a diode 332. The elements 324-332, inclusive, are configured to define throttle control circuitry 334. The throttle control circuitry 334 is also referred to as analog signaling 334 for purposes of the present teachings. The throttle control circuitry 334 receives input signals at a node 336 and provides corresponding DC-level, or very low frequency, analog signals at a signal output node 338.

The analog signals at node 338 can be used to throttle (i.e., scale back) the intensity of operations of a computer (e.g., 102) coupled to receive power from the power supply 300. Additionally or alternatively, the analog signals at node 338 can be used to communicate a maximum power capacity or other information regarding the power supply 300. While not shown, it is to be understood that a suitable controller is used to provide the control signals at nodes 314 and 336. The specific identity and configuration of such a controller is not germane to the present teachings. Moreover, elements 302-338 and the particular circuitry defined thereby are known to one of ordinary skill in the electrical arts and are provided as context for understanding the present teachings.

The power supply 300 further includes metering 340 according to the present teachings. The metering 340 can also be referred to as power metering 340, and can be defined by a suitable microcontroller, or comprised of a processor, state machine or other dedicated-purpose devices or circuits. The power supply 300 also includes a pair of resistors 342 and 344 defining a voltage sense node 346 there between. The metering 340 is coupled to the voltage sense node 346 so as to detect the instantaneous voltage provided at node 304.

The metering 340 is also coupled across a current sense resistor 348. The current sense resistor 348 exhibits an electrical potential there across corresponding to the instantaneous electrical current "I" flowing there through as provided by the source 106. In this way, the metering 340 is coupled to sense (or detect) the instantaneous voltage and current after the rectifier 302, the energy having been provided by the source 106 to the power supply 300. The metering 340 can then calculate the instantaneous power (i.e., watts) consumed by the power supply 300 and a computer (e.g., 102) coupled to the output nodes 320 and 322.

The metering 340 is further configured to store power data corresponding to the measured voltage and current values. The metering 340 is also configured to totalize, or time integrate, the calculated power value in order to determine energy consumption over some period of time (e.g., watt-hours, etc.).

The metering 340 includes a transceiver (e.g., 124) that is configured to output the power data, which is digital in nature, as a high-frequency signal.

The power supply 300 also includes resistors 352 and 354, and transistor 356 that are configured to shift the high-frequency (i.e., digital) signal at node 341 from a first voltage domain (three-point-three volts) to a higher voltage domain (e.g., five volts) for purposes of increasing the amplitude of the signal. Diodes 358 and 360, respectively, clip or limit the high frequency signal that is AC coupled to an isolation transformer 362 by way of a coupling capacitor 364.

The output of the isolation transformer 362 is coupled to the analog signaling node 338 by way of a coupling capacitor 366. In this way, the high-frequency signals, carrying the digital power data, are superimposed on the DC-level analog signals being provided to node 338. Additionally, the metering 340 is DC-isolated from the analog signal node 338. In another embodiment, voltage sense, current sense, metering and transceiver elements (e.g., 340-362) are located before a corresponding rectifier (e.g., 302) in addition to suitable means for powering such circuitry. The isolation transformer 362 can also be used to step-up the amplitude of the digital signal.

The power supply 300 is configured to provide regulated (conditioned) operating power to a computer by way of nodes 320 and 322. The power supply 300 is also configured to provide analog signals to the computer at the node 338. Additionally, metering 340 can measure the electrical power provided from the source 106 to the power supply 300, and to communicate corresponding power data (e.g., watts, watt-hours, volts, amps, etc.) to the computer by way of node 338. Such power data is superimposed onto the analog signals at node 338 as digital, high-frequency signal content. Normal operation of the power supply 300 is generally as described above in regard to the power supply 104.

Second Illustrative Embodiment

Figure 4:
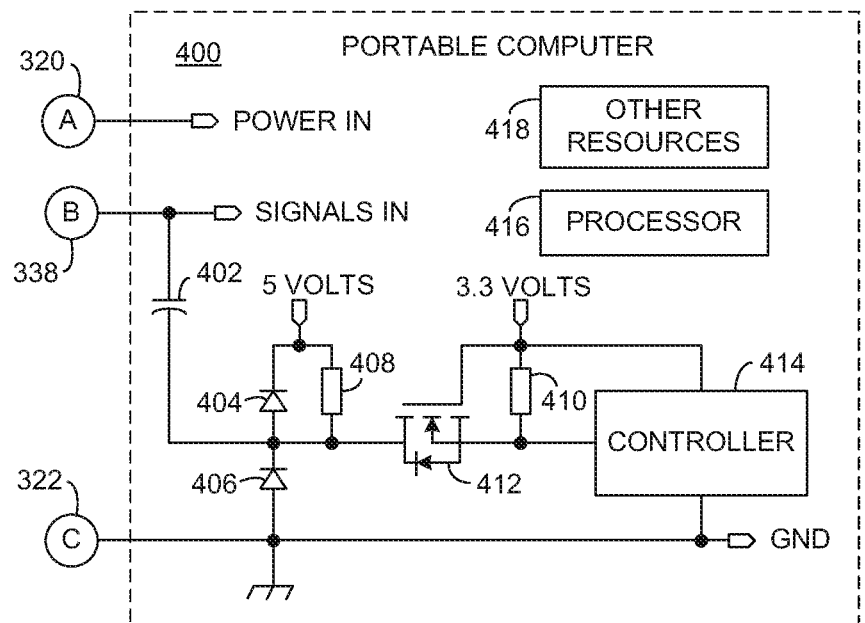
FIG. 4 depicts a schematic diagram of an apparatus according to another embodiment.

Attention is now directed to FIG. 4, which is a schematic diagram depicting a portable computer 400. The portable computer 400 is illustrative and non-limiting in nature. As such, other portable computers inclusive of the present teachings are contemplated.

The portable computer is configured to be coupled to operating electrical power at the positive node 320 and ground node 322, as well as signals at the node 338. The portable computer 400 includes a coupling capacitor 402 connected to node 338. A pair of clipping diodes 404 and 406, respectively, limit the amplitude of signals received by way of the coupling capacitor 402. In turn, resistors 408 and 410, and a transistor 412, operate to shift the level of the high-frequency signals between a higher voltage domain (e.g., five volts) and a three-point-three volt domain.

The portable computer 400 further includes a controller 414. The controller 414 is configured to receive the level-shifted high-frequency signals and to provide corresponding digital data to a processor 416. In one embodiment, the controller 414 is defined by or includes a transceiver. Other embodiments of controller 414 can also be used.

The portable computer 400 includes a processor 416 as introduced above. The portable computer 400 further includes other resources 418 as required or desired for normal operation. Non-limiting examples of such other resources 418 include a display, a keyboard, a mouse, software, a memory, mass data storage, etc. One having ordinary skill in the computer arts appreciates the normal resource complement of a portable computer, and further elaboration is not required here.

The power supply 300 and the portable computer 400 are configured and cooperative so that a user can monitor electrical energy consumption by the resulting combination. Additionally, such a user can determine the relative effectiveness of their energy conservation efforts by way of the power data provided by the power supply 300. For non-limiting example, the power supply 300 and portable computer 400 can be used to perform the method of FIG. 2, as well as other methods within the scope of the present teachings.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments in sum, it should be understood that the invention is capable of modification and variation and is limited only by the following claims.

What is claimed is:

1. A system, comprising:
   a power supply including a power transformer having a primary side connected to a control transistor controlled by a transformer control signal, the power transformer further having a secondary side coupled to a diode which is further coupled to a filter capacitor and configured to provide regulated DC electrical power to a computer via a positive output node, the power supply further configured with resistors, a second transistor and a diode to define throttle control circuitry with analog signals and to communicate power data to the computer with digital signals via an isolation transformer over a separate throttle control signal, the power data representing electrical power provided from a source to the power supply; and
   a computer configured to receive the regulated electrical power on the positive output node and the power data from the separate throttle control signal of the power supply, the computer including a transceiver configured to extract the digital signals superimposed onto the analog signals on the separate throttle control signal.

2. The system according to claim 1, the power supply including a transceiver configured to superimpose the digital signals onto the analog signals on the separate throttle control signal.

3. The system according to claim 2, the power supply including a processor coupled in data communication with the transceiver.

4. The system according to claim 1, the power supply further configured to provide throttle control signals to the computer on the separate throttle control signal.

5. The system according to claim 4, the computer further configured to control one or more normal operations in accordance with the throttle control signals.

6. The system according to claim 1, the power supply further configured to be disposed external to the computer while providing the regulated electrical power to the computer.

7. The system according to claim 1, the computer storing a program code configured to cause the computer to display the power data to a user.

8. The system according to claim 1, the power supply configured such that the power data represents totalized electrical power provided from the source to the power supply.

9. The system according to claim 1, the power supply configured such that the power data represents instantaneous electrical power provided from the source to the power supply.

10. The system according to claim 1, computer further configured to transmit a request for the power data to the power supply.

11. The system according to claim 1 wherein the power data communicates a power capacity of the power supply.

12. The system according to claim 1 wherein the computer includes a processor configured to execute computer code to track historical cost savings based on conservation efforts by a user of the computer.

13. A power supply, comprising:
    power circuitry configured to receive electrical power from a source and to provide conditioned electrical DC power via a positive output node to a computer wherein the power circuitry includes a power transformer having a primary side connected to the source and a control transistor controlled by a transformer control signal, the power transformer further having a secondary side coupled to a diode which is further coupled to a filter capacitor and;
    signaling circuitry configured to provide analog signals to the computer over a separate throttle control signal via an isolation transformer, wherein the signaling circuitry includes resistors, a second transistor and a diode to define throttle control circuitry;
    a controller configured to measure electrical power provided from the source to the power supply and to derive power data corresponding to the measurements; and
    communications circuitry configured to superimpose digital signals onto the analog signals on the separate throttle control signal, the controller further configured to provide the power data to the computer by way of the communications circuitry.

14. The power supply according to claim 13, the controller including at least a microcontroller or a microprocessor or a state machine.

15. The power supply according to claim 13, the communications circuitry including a one-wire transceiver.

16. The power supply according to claim 13, the controller further configured to measure electrical voltage and electrical current.

17. The system according to claim 11 wherein the power data includes at least one of a maximum and a minimum of at least one value of instantaneous power, totalized power, voltage, and current.

18. The power supply according to claim 13 wherein the power data communicates a power capacity of the power supply.

19. The power supply according to claim 18 wherein the power data includes at least one of a maximum and a minimum of at least one value of instantaneous power, totalized power, voltage, and current.

* * * * *